United States Patent
Sang et al.

(10) Patent No.: US 11,120,270 B2
(45) Date of Patent: Sep. 14, 2021

(54) SPATIOTEMPORAL ACTION DETECTION METHOD

(71) Applicant: HUAZHONG UNIVERSITY OF SCIENCE AND TECHNOLOGY, Hubei (CN)

(72) Inventors: Nong Sang, Hubei (CN); Shiwei Zhang, Hubei (CN); Zhiyuan Li, Hubei (CN); Changxin Gao, Hubei (CN); Yuanjie Shao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 16/965,015

(22) PCT Filed: Jan. 7, 2020

(86) PCT No.: PCT/CN2020/070684
§ 371 (c)(1),
(2) Date: Jul. 27, 2020

(87) PCT Pub. No.: WO2020/173226
PCT Pub. Date: Sep. 3, 2020

(65) Prior Publication Data
US 2021/0248378 A1  Aug. 12, 2021

(30) Foreign Application Priority Data
Feb. 28, 2019  (CN) .......................... 201910153037.0

(51) Int. Cl.
G06K 9/00  (2006.01)
G06T 3/00  (2006.01)
(Continued)

(52) U.S. Cl.
CPC ..... *G06K 9/00718* (2013.01); *G06K 9/00765* (2013.01); *G06T 3/0087* (2013.01);
(Continued)

(58) Field of Classification Search
CPC combination set(s) only.
See application file for complete search history.

(56) References Cited

U.S. PATENT DOCUMENTS

2010/0104199 A1   4/2010  Zhang et al.
2019/0172224 A1*  6/2019  Vajda .................... G06T 7/77
(Continued)

FOREIGN PATENT DOCUMENTS

CN   108805015   11/2018
CN   109190479    1/2019
CN   109961019    7/2019

OTHER PUBLICATIONS

Hu et al., "Weakly-supervised convolutional neural networks for multimodal image registration", Oct. 2018, Medical Image Analysis, vol. 49, pp. 1-13, https://www.sciencedirect.com/science/article/pii/S1361841518301051 (Year: 2018).*
(Continued)

*Primary Examiner* — Zhiyu Lu
(74) *Attorney, Agent, or Firm* — JCIP Global Inc.

(57) ABSTRACT

A spatiotemporal action detection method includes performing object detection on all frames of a sample video to obtain a candidate object set; calculating all interframe optical flow information on the sample video to obtain a motion set; constructing a spatiotemporal convolution-deconvolution network of an attention mechanism and a motion attention mechanism of an additional object; adding both a corresponding sparse variable and a sparse constraint to obtain a network structure S after performing spatiotemporal convolution processing on each time segment of the sample video;
(Continued)

training the network structure S with an objective function based on classification loss and loss of the sparse constraint of cross entropy; and calculating an action category and a sparse coefficient corresponding to each time segment of a test sampled video to obtain an object action spatiotemporal location.

11 Claims, 3 Drawing Sheets

(51) Int. Cl.
 G06T 7/207 (2017.01)
 G06T 7/215 (2017.01)
 G06T 3/40 (2006.01)
(52) U.S. Cl.
 CPC ............ *G06T 3/4053* (2013.01); *G06T 7/207* (2017.01); *G06T 7/215* (2017.01); *G06K 2209/21* (2013.01); *G06T 2207/10016* (2013.01); *G06T 2207/20072* (2013.01); *G06T 2207/20076* (2013.01); *G06T 2207/20164* (2013.01)

(56) References Cited

U.S. PATENT DOCUMENTS

2020/0019921 A1* 1/2020 Buibas .................. G06K 9/6288
2020/0320659 A1* 10/2020 Whiting .................... G06T 7/12

OTHER PUBLICATIONS

Jayaraman et al., "Quadtree Convolutional Neural Networks", 2018, ECCV, https://openaccess.thecvf.com/content_ECCV_2018/papers/Pradeep_Kumar_Jayaraman_Quadtree_Convolutional_Neural_ECCV_2018_paper.pdf (Year: 2018).*
Schilling, "The Effect of Batch Normalization on Deep Convolutional Neural Networks", 2016, KTH Royal Institute of Technology School of Computer Science and Communication, https://www.diva-portal.org/smash/get/diva2:955562/FULLTEXT01.pdf (Year: 2016).*
Yasrab et al., "An Encoder-Decoder Based Convolution Neural Network (CNN) for Future Advanced Driver Assistance System (ADAS)", Mar. 2017, MDPI Applied Sciences, file:///C:/Users/zlu/Downloads/applsci-07-00312.pdf (Year: 2017).*
Gu et al., "Recent Advances in Convolutional Neural Networks", Oct. 2017, arxiv.org, https://arxiv.org/pdf/1512.07108.pdf (Year: 2017).*
Mathieu et al., "Deep Multi-Scale Video Prediction Beyond Mean Square Error", Feb. 2016, ICLR 2016, https://research.fb.com/wp-content/uploads/2016/11/deep_multi-scale_video_prediction_beyond_mean_square_error.pdf? (Year: 2016).*
Prakash, "Leveraging Inexpensive Supervision Signals for Visual Learning", May 2017, Carnegie Mellon University, https://www.ri.cmu.edu/wp-content/uploads/2017/05/Masters_Thesis.pdf (Year: 2017).*
"International Search Report (Form PCT/ISA/210) of PCT/CN2020/070684," dated Apr. 8, 2020, pp. 1-5.

* cited by examiner

SPATIOTEMPORAL ACTION DETECTION METHOD

CROSS-REFERENCE TO RELATED APPLICATION

This application is a 371 of international application of PCT application serial no. PCT/CN2020/070684, filed on Jan. 7, 2020, which claims the priority benefit of China application no. 201910153037.0, filed on Feb. 28, 2019. The entirety of each of the above mentioned patent applications is hereby incorporated by reference herein and made a part of this specification.

BACKGROUND

Technical Field

The disclosure relates to the field of computer vision, and more particularly, relates to a spatiotemporal action detection method.

Description of Related Art

At present, action analysis is an important and active research topic in computer vision. Action analysis has a wide range of applications in the field of social security, such as detection of abnormal action in a monitored environment and detection and identification of theft in shopping malls. Further, action analysis is irreplaceable in human-computer interaction, for example, service robots can effectively predict the action of the elderly to prevent accidents. In addition, action analysis may also be used for the detection and recognition of pornographic, reactionary, and violent actions on existing social networks, live broadcast platforms, etc.

The current action detection methods are divided into two categories according to the required supervision information. One action detection method is based on strong supervision, whose supervision signals includes a detection frame, start and end marks in time of an action, and a video tag. The other action detection method is based on weak supervision, and the supervision signal includes only the category mark of a video. At present, many studies on the first method are available, and the studies have achieved good performance on public data sets. Nevertheless, actual needs are far from being satisfied. That is because in actual scenarios, a large number of sample marks are required to achieve acceptable performance. Moreover, due to the difficulty and particularity of action marking, such demand is difficult to be met. The second method based on weak supervision, which makes better use of an existing sample that contains only a category mark and may effectively mine action feature in a self-learning manner. Three elements are required to converge for an action to occur: action executor, specific motion information, and time sequence. Nevertheless, existing methods fail to address these three aspects at the same time. The existing methods mainly use the attention mechanism of multi-instance learning and self-learning model to locate a target action, but robustness provided by such methods is low. In a complex occasion when a large number of objects are present, performance of such methods is significantly lowered.

Therefore, technical problems such as requirement for considerable manpower and material resources, impracticability, and low robustness may still be found in the existing spatiotemporal action detection methods.

SUMMARY

In view of the defects of the related art, the disclosure provides a spatiotemporal action detection method aiming to solve the problem of low robustness which exists in a weakly-supervised spatiotemporal action detection method caused by failure of the related art to effectively combine an executor, specific motion information, and a time sequence recognition action.

To accomplish the foregoing aim, the disclosure provides a spatiotemporal action detection method including the following steps.

(1) Object detection is performed on all frames in a sample video to obtain a candidate object set.

(2) All interframe optical flow information is calculated in the sample video to obtain a motion set.

(3) A spatiotemporal convolution-deconvolution network of an attention mechanism and a motion attention mechanism of an additional object is constructed based on the candidate object set and the motion set.

(4) The spatiotemporal convolution-deconvolution network is inputted and both a corresponding sparse variable and a sparse constraint are added to obtain a network structure S after spatiotemporal convolution processing is performed on each time segment of the sample video.

(5) The network structure S is trained with an objective function based on classification loss and loss of the sparse constraint of a cross entropy function.

(6) An action category, a sparse coefficient, and a distribution probability map thereof corresponding to each time segment of a test sampled video are calculated based on the network structure S to obtain an object action spatiotemporal location.

Preferably, step (1) specifically includes the following.

(1.1) Images contained in the sample video are scaled to a same size.

(1.2) The object detection is performed on the normalized images by using a target detector and a feature pyramid network to obtain two object detection frame results.

(1.3) Non-maximum suppression is performed on a union of two object detection frames to obtain a filtered object position.

(1.4) An unfiltered object detection frame is tracked by using a fast tracking method and a wave filter to find a position of an undetected object.

Preferably, step (2) specifically includes the following.

(2.1) Values of optical flows in a horizontal direction and a vertical direction contained in the optical flow information are normalized.

(2.2) Grayscale images of a single channel in the horizontal direction and the vertical direction of the optical flow images are obtained by using the Pythagorean theorem.

(2.3) A motion information interval is obtained according to the grayscale images.

Preferably, step (3) specifically includes the following.

(3.1) Global averaging pooling is performed on a last layer of down-sampling layers in a spatiotemporal convolution network to obtain vectorized expression of a convolution layer.

(3.2) The vectorized expression of the convolution layer and the last layer of the down-sampling layers are added to obtain a first layer of up-sampling layers in a deconvolution network.

(3.3) A feature map corresponding to the down-sampling layers is overlaid on each layer of feature maps of the deconvolution network to complete construction of a spatiotemporal convolution and deconvolution network.

(3.4) The global averaging pooling is performed on a last layer of feature maps of the up-sampling layers of a spatio temporal deconvolution network to get the vectorized expression.
(3.5) Object saliency supervision is added to any selected layer of feature maps in the spatiotemporal convolution and deconvolution network.
(3.6) Motion saliency supervision is added to any selected layer of the feature maps in the spatiotemporal convolution and deconvolution network to complete construction of the spatiotemporal convolution-deconvolution network.
(3.7) A fully-connected layer is connected after the convolution layer is vectorially expressed and a deconvolution layer is vectorially expressed, where the fully-connected layer is configured to predict the action category.

Preferably, step (4) specifically includes the following.
(4.1) The sample video is divided into T time segments after spatiotemporal convolution and features $x_i(i=1, \ldots, T)$ of the fully-connected layer connected to the spatiotemporal convolution network are stitched.
(4.2) A T-dimensional weight vector $w=[w_1, w_2, \ldots, w_T]$ is calculated through the global averaging pooling.
(4.3) The sparse constraint obtained according to the weight vector is added to the spatiotemporal convolution-deconvolution network to complete construction of the network structure S.

Preferably, step (6) specifically includes the following.
(6.1) The non-maximum suppression is performed on detection frames sampled and obtained on a heat map to obtain object candidate frames.
(6.2) A time interval of an action is filtered through calculating the weight vector corresponding to each time segment in the sample video.
(6.3) A space location corresponding to the object candidate frames is combined with the times interval to obtain the object action spatiotemporal location.

Preferably, step (6.1) specifically includes the following.
(6.1.1) A distribution probability map of the action is calculated by using a grade-based class activation map (Grad-CAM).
(6.1.2) Dense sampling is performed on the heat map to obtain detection frames of various sizes.
(6.1.3) The non-maximum suppression is performed on each detection frame with a threshold of 0.3 to obtain the object candidate frames.
(6.1.4) The object candidate frames are sorted, and a formula for sorting is provided as follows:

$$s = \frac{sum(H(x, y, w, h))}{w \times h} + \varepsilon * (w \times h),$$

where, sum(H(x, y, w, h)) represents an interval [x, y, w, h], a hyper parameter $\varepsilon$ is configured to be 0.00002, (x, y) represent initial coordinates corresponding to an object candidate frame on the heat map, w and h respectively represent a height and a width of the object candidate frame, and H represents all heat energy values in the object candidate frame.
(6.1.5) An obtained object candidate frame is corrected, and a formula for correcting is provided as follows:

$$B_t = \begin{cases} B_h, & IoU(B_s, B_h) > 0.3 \\ S(B_s, B_{t-1}), & \text{otherwise} \end{cases},$$

where $B_t$ represents the object detection frame at time t, $B_s$ is the obtained object candidate frame, and a function S represents size adjustment of $B_s$ to be identical to a size of $B_{t-1}$ while keeping a center unchanged.

Preferably, the step of obtaining the action distribution probability map specifically includes the following.
a. A channel weight $d_k^c$ corresponding to a type c and $k^{th}$ layer of the feature maps in the network structure S is calculated.
b. A a grade-based class activation map is calculated based on the obtained channel weight and the feature map, $$L_{G-C}^c = ReLU\left(\sum_k \alpha_k^c A^k\right),$$

where $L_{G-C}^c$ is a category activation map of the type c action.

Preferably, step (3.4) specifically includes the following.
(3.4.1) An object saliency map $A_H$ is constructed according to the object detection frames contained in an object set.
(3.4.2) The object saliency supervision is added to an $m^{th}$ layer of the feature maps of the spatiotemporal convolution and deconvolution network to obtain model output:

$$f_o=(1+A_H \cdot f_m)/(1+\alpha)$$

where $f_m$ is the feature map of the $m^{th}$ layer, $f_o$ is the model output after the object saliency supervision is added, and the hyper parameter $\alpha$ is configured to adjust an object saliency degree.

Preferably, step (3.5) specifically includes the following.
(3.5.1) An optical flow map $A_M$ in an input sequence is extracted through an optical flow method in the input sequence.
(3.5.2) The motion saliency supervision is added to the $m^{th}$ layer of the feature maps of the spatiotemporal convolution and deconvolution network to obtain model output:

$$f_o=(1+A_M \cdot f_m)/(1+\beta)$$

where $f_m$ is the feature map of the $m^{th}$ layer, $f_o$ is the model output after the motion saliency supervision is added, and a hyper parameter $\beta$ is configured to adjust an motion saliency degree.

After the sparse constraint is added in step (4.3), an objective function of the spatiotemporal convolution and deconvolution network is:

$$l=l_{class}+\lambda l_{sparse}$$

where $l_{sparse}=\|w\|_1$ is sparsity loss configured to forcibly eliminate a part with a sparse coefficient of 0 and keep a part with a sparse coefficient whose value is not 0, $l_{class}$ class is configured to classify cross entropy loss, and $\lambda$ is a weight coefficient.

Based on the learning of the network structure S, feature maps with non-zero sparse weights are filtered, and feature maps with sparse weights close to zero are eliminated. Generally, the feature maps having large weight coefficients may include actions.

The above technical solutions provided by the disclosure have the following beneficial effects compared with the related art.
(1) In the spatiotemporal action detection technique provided by the disclosure, when deep model learning is performed, two attributes including an object and motion are effectively applied. Further, end-to-end learning is performed on all features, so that a feature for differentiating is provided to action detection. Moreover, through the object detection and optical flow prediction method, the action search space is reduced, and favorable robustness is provided in a complex scene when a large number of objects are present.

(2) In the spatiotemporal action detection technique provided by the disclosure, through the sparse constraint method, time positioning and space positioning may be completed at one time in action detection, so that detection reliability is improved and detection efficiency is significantly enhanced through the independent two-step method compared to other methods.

(3) In the spatiotemporal action detection technique provided by the disclosure, a spatiotemporal convolution network is used for spatiotemporal features of an action, and a spatiotemporal deconvolution network is also designed. In this way, time loss in the spatiotemporal convolution structure is effectively compensated, which is conducive to the frame-level positioning of a video.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure.

Figure 1:
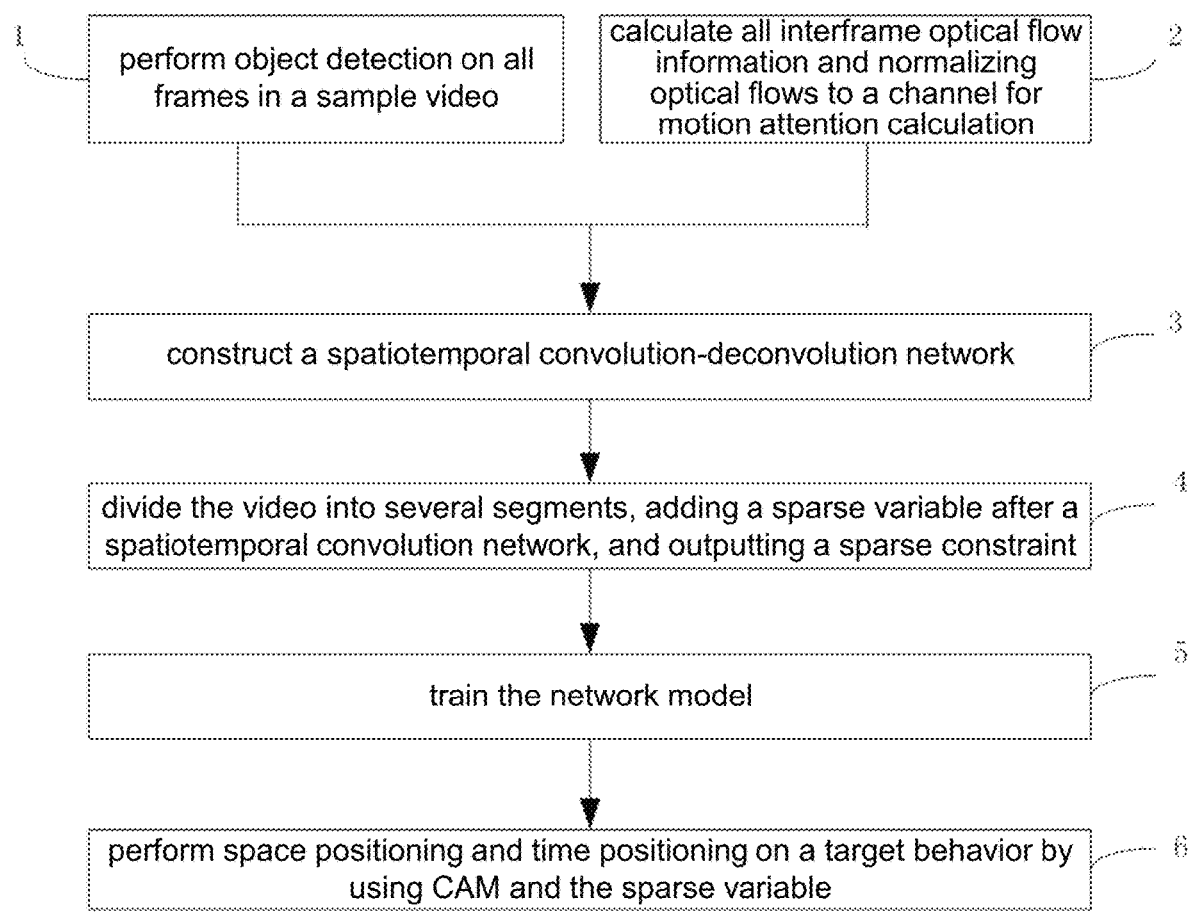
FIG. 1 is a flow chart of an action detection method based on weak-supervision provided by the disclosure.

As shown in FIG. 1, the disclosure provides a spatiotemporal action detection method based on weak-supervision, and the method includes the following.
(1) Object detection is performed on all frames in a sample video to obtain a candidate object set.
(2) All interframe optical flow information is calculated in the sample video to obtain a motion set.
(3) A spatiotemporal convolution-deconvolution network of an attention mechanism and a motion attention mechanism of an additional object is constructed based on the candidate object set and the motion set.
(4) The spatiotemporal convolution-deconvolution network is inputted and both a corresponding sparse variable and a sparse constraint are added to obtain a network structure S after spatiotemporal convolution processing is performed on each time segment of the sample video.
(5) The network structure S is trained with an objective function based on classification loss and loss of the sparse constraint of a cross entropy function.
(6) An action category, a sparse coefficient, and a distribution probability map thereof corresponding to each time segment of a test sampled video are calculated based on the network structure S to obtain an object action spatiotemporal location.

Preferably, step (1) specifically includes the following.
(1.1) Images contained in the sample video are scaled to a same size, such as 300*300 pixels provided in the embodiments.
(1.2) The object detection is performed on the normalized images by using a target detector (Faster-RCNN) and a feature pyramid network (FPN) to obtain two object detection frame results.
(1.3) Non-maximum suppression is performed on a union of two object detection frames to obtain a filtered object position. Preferably, a threshold of the non-maximum suppression is configured to be 0.5.
(1.4) An unfiltered object detection frame is tracked by using a fast tracking method and a wave filter to find a position of an undetected object.

Preferably, forward or backward tracking is performed on remaining detection frames that are discontinuous within 10 frames in time and whose intersection over union (IoU) is greater than 0.5.

Preferably, step (2) specifically includes the following.
(2.1) Values of optical flows in a horizontal direction and a vertical direction contained in the optical flow information are normalized.

Preferably, a dense flow is adopted when calculating all interframe optical flows in the sample video. The configured parameters include: a maximum bound which is 15 and a sampling step which is 1. Optical flow images in the horizontal direction and the vertical direction calculated and obtained through such configuration are normalized.
(2.2) Grayscale images of a single channel in the horizontal direction and the vertical direction of the optical flow images are obtained by using the Pythagorean theorem.
(2.3) A motion information interval is obtained according to the grayscale images.

Figure 2:
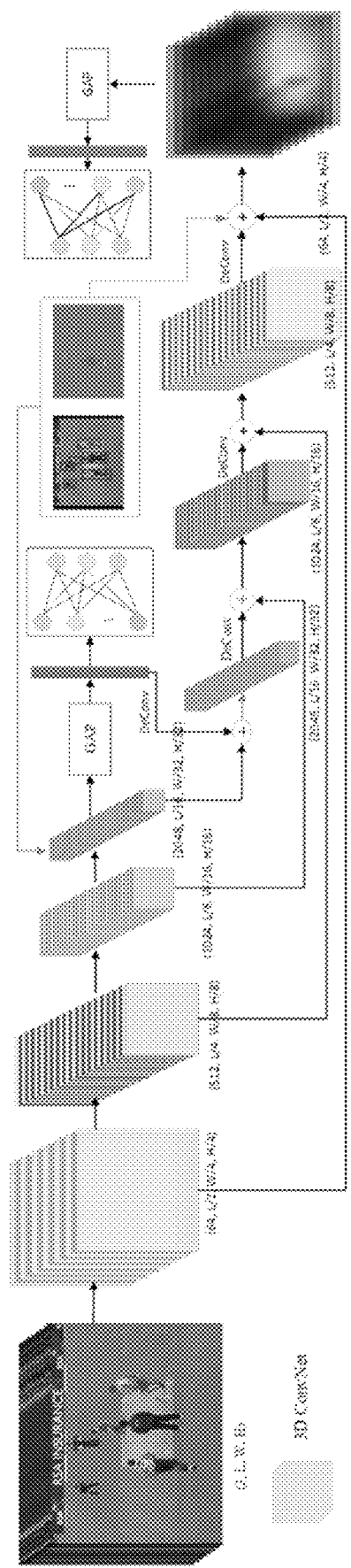
FIG. 2 is a spatiotemporal convolution-deconvolution network provided by the disclosure.

Preferably, as shown in FIG. 2, step (3) specifically includes the following.
(3.1) Global averaging pooling is performed on the last layer of down-sampling layers in a spatiotemporal convolution network to obtain vectorized expression of a convolution layer.
(3.2) The vectorized expression of the convolution layer and the last layer of the down-sampling layers are added to obtain a first layer of up-sampling layers in a deconvolution network.
(3.3) A feature map corresponding to the down-sampling layers is overlaid on each layer of feature maps of the deconvolution network to complete construction of a spatiotemporal convolution and deconvolution network.
(3.4) The global averaging pooling is performed on a last layer of feature maps of the up-sampling layers of a spatiotemporal deconvolution network to get the vectorized expression.

Preferably, the sample video inputted in the spatiotemporal convolution and deconvolution network is required to be preprocessed, and the video frames are normalized to a size of 3*160*160 and are normalized into a same normal distribution.
(3.5) Object saliency supervision is added to any selected layer of feature maps in the spatiotemporal convolution and deconvolution network.

Preferably, the method of adding the object saliency supervision provided in step (3.5) is: constructing an object saliency map AH according to the object detection frames contained in an object set. The detection frames with the object are configured to be 1, and the rest of the detection frames are configured to be 0. The object saliency supervision is added to the $m^{th}$ layer of feature maps of the spatiotemporal convolution and deconvolution network, that is:

$$f_o = (1 + A_H \cdot f_m)/(1 + \alpha)$$

where $f_m$ is the feature map of the $m^{th}$ layer, $f_o$ is a model output after the object saliency supervision is added, and a hyper parameter α is configured to adjust an object saliency degree, which is configured to be 0.5 in this embodiment and may retain background information to a certain extent.

(3.6) Motion saliency supervision is added to any selected layer of the feature maps in the spatiotemporal convolution and deconvolution network to complete construction of the spatiotemporal convolution-deconvolution network.

Preferably, in step (3.6), the step of adding the motion saliency supervision is: extracting an optical flow map $A_M$ in an input sequence through an optical flow method in the input sequence. The motion saliency supervision is added to the $m^{th}$ layer of the feature maps of the spatiotemporal convolution and deconvolution network, that is:

$$f_o = (1 + A_M f_M)/(1+\beta)$$

where $f_m$ is the feature map of the $m^{th}$ layer, $f_o$ is a model output after the motion saliency supervision is added, and a hyper parameter β is configured to adjust a motion saliency degree, which is configured to be 1 in this embodiment and may save non-motion information to a certain extent while increasing attention to motion.

(3.7) A fully-connected layer is connected after the convolution layer is vectorially expressed and a deconvolution layer is vectorially expressed, where the fully-connected layer is configured to predict the action category.

Figure 3:
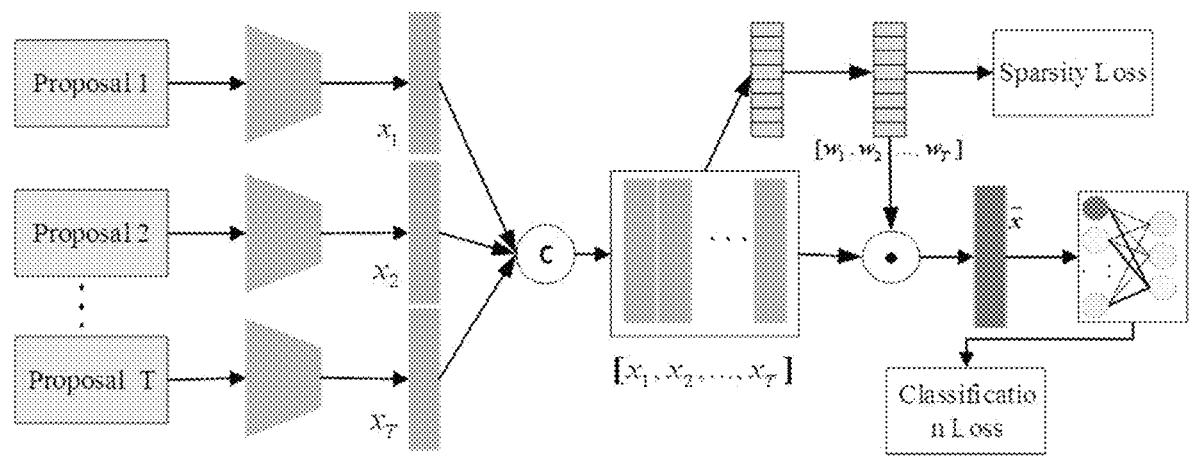
FIG. 3 is a weakly-supervised time sequence detection structure provided by the disclosure.

Preferably, as shown in FIG. 3, step (4) specifically includes the following.

(4.1) The sample video is divided into T time segments, all time segments are inputted into the spatiotemporal convolution-deconvolution network, and features $x_i$(i=1, ..., T) of the fully-connected layer corresponding to the spatiotemporal convolution network are stitched.

(4.2) A T-dimensional weight vector $w=[w_1, w_2, ..., w_T]$ is calculated through the global averaging pooling.

(4.3) The sparse constraint is added into the spatiotemporal convolution-deconvolution network to obtain the network structure S.

Preferably, the step of constructing the network structure S based on a time positioning of the sparse constraint specifically includes the following.

a. The last layer of the down-sampling layers of the spatiotemporal convolution network is lowered to a one-dimensional vector through the global averaging pooling.

b. One weight vector $w=[w_1, w_2, ..., w_T]$ is added to the one-dimensional vector corresponding to each segment.

c. After the one-dimensional vector is multiplied by the weight vector, a mean value is summed up, and the obtained feature is added to the fully-connected layer to be configured for action classification on one hand and is configured for the spatiotemporal deconvolution network on the other hand.

Preferably, after the sparse constraint is added in step (4.3), the objective function of the spatiotemporal convolution and deconvolution network is:

$$l = l_{class} + \lambda l_{sparse},$$

where $l_{sparse} = \|w\|_1$ is sparsity loss configured to forcibly eliminate a part with a sparse coefficient of 0 and keep a part with a sparse coefficient whose value is not 0, $l_{class}$ is configured to classify cross entropy loss, λ is a weight coefficient, and λ=0.0001 in this embodiment.

Preferably, in the process of training the network structure S in step (5), first, the spatiotemporal convolution/deconvolution network is pre-trained in a data set Kinetics. Next, network training is performed on target data, a learning rate is configured to be 0.001, and training is performed for 160 rounds.

Based on the learning of the network structure S, feature maps with non-zero sparse weights are filtered, and feature maps with sparse weights close to zero are eliminated. Generally, the feature maps having large weight coefficients may include actions.

Preferably, in step (6) of calculating the action category corresponding to each time segment of the test sampled video, a spatial positioning action is performed through a grade-based class activation map method.

Preferably, in step (6) of performing action detection of the test sampled video, such detection is divided into space detection and time detection, and the following steps are specifically included.

(6.1) The non-maximum suppression is performed on detection frames sampled and obtained on a heat map to obtain object candidate frames.

Preferably, the step of obtaining the action distribution probability map specifically includes the following.

a. A weight $\alpha_k^c$ of the feature maps corresponding to each channel in the network structure S after the global averaging pooling is performed is obtained:

$$\alpha_k^c = \frac{1}{Z} \sum_i \sum_j \frac{\partial y^c}{\partial A_{ij}^k},$$

where $\alpha_k^c$ represents the weight of a type c (0≤c≤L−1, L represents a total number of the action categories) target in a k-layer feature map, $y^c$ represent a score of a type c action target, and $A_{ij}^k$ represents an activation value corresponding to a position (i, j) of the $k^{th}$ layer of the feature map.

b. A distribution probability map, that is, the heat map, of the action is calculated by using the grade-based class activation map, $$L_{G-C}^c = ReLU\left(\sum_k \alpha_k^c A^k\right),$$

where $L_{G-C}^c$ is a category activation map of the type c action.

Preferably, step (6.1) specifically includes the following.

(6.1.1) A distribution probability map of the action is calculated by using a grade-based class activation map (Grad-CAM).

(6.1.2) Dense sampling is performed on heat map to obtain detection frames of various sizes.

(6.1.3) The non-maximum suppression is performed on each detection frame with a threshold of 0.3 to obtain the object candidate frames.

(6.1.4) The object candidate frames are sorted, and a formula for sorting is provided as follows:

$$s = \frac{sum(H(x, y, w, h))}{w \times h} + \varepsilon * (w \times h),$$

where, sum(H(x, y, w, h)) represents an interval [x, y, w, h], a hyper parameter ε is configured to be 0.00002, (x, y) represent initial coordinates corresponding to an object candidate frame on the heat map, w and h respectively represent a height and a width of the object candidate frame, and H represents all heat energy values in the object candidate frame.

(6.1.5) An obtained object candidate frame is corrected, and a formula for correcting is provided as follows:

$$B_t = \begin{cases} B_h, & IoU(B_s, B_h) > 0.3 \\ S(B_s, B_{t-1}), & \text{otherwise} \end{cases},$$

where $B_t$ represents the object detection frame at time t, B is the obtained object candidate frame, and a function S represents size adjustment of $B_s$ to be identical to a size of $B_{t-1}$ while keeping a center unchanged. Backward updating of each time may be accomplished through the foregoing method, such that the problem of the saliency map failing to cover the whole body of action is solved.

(6.2) A time interval of an action is filtered through calculating the weight vector corresponding to each time segment of the sample video.

Preferably, a non-0 segment acts as the time interval of the action.

(6.3) A space location corresponding to the object candidate frames is combined with the time interval to obtain the object action spatiotemporal location.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A spatiotemporal action detection method, comprising:
   (1) performing object detection on all frames of a sample video to obtain a candidate object set;
   (2) calculating all interframe optical flow information on the sample video to obtain a motion set;
   (3) constructing a spatiotemporal convolution-deconvolution network of an attention mechanism and a motion attention mechanism of an additional object based on the candidate object set and the motion set;
   (4) inputting the spatiotemporal convolution-deconvolution network and adding both a sparse variable and a sparse constraint corresponding to the sparse variable to obtain a network structure S after performing spatiotemporal convolution processing on each time segment of the sample video;
   (5) training the network structure S with an objective function based on classification loss and loss of the sparse constraint of cross entropy; and
   (6) calculating an action category, a sparse coefficient, and a distribution probability map of an action corresponding to each time segment of a test sampled video based on the network structure S to obtain an object action spatiotemporal location.

2. The spatiotemporal action detection method according to claim 1, wherein the step (1) specifically comprises:
   (1.1) scaling images contained in the sample video to a same size;
   (1.2) performing the object detection on the normalized images by using a target detector and a feature pyramid network (FPN) to obtain two object detection frame results;
   (1.3) performing non-maximum suppression on a union of two object detection frames to obtain a filtered object position;
   (1.4) tracking an unfiltered object detection frame by using a fast tracking method and a wave filter to find a position of an undetected object.

3. The spatiotemporal action detection method according to claim 1, wherein the step (2) specifically comprises:
   (2.1) performing normalization on values of optical flows in a horizontal direction and a vertical direction contained in the optical flow information;
   (2.2) obtaining grayscale images of a single channel in the horizontal direction and the vertical direction of optical flow images by using the Pythagorean theorem;
   (2.3) obtaining a motion information interval according to the grayscale images.

4. The spatiotemporal action detection method according to claim 3, wherein the step (3) specifically comprises:
   (3.1) performing global averaging pooling on a last layer of down-sampling layers in a spatiotemporal convolution network to obtain vectorized expression of a convolution layer;
   (3.2) adding the vectorized expression of the convolution layer and the last layer of the down-sampling layers to obtain a first layer of up-sampling layers in a deconvolution network;
   (3.3) overlaying a feature map corresponding to the down-sampling layers on each layer of feature maps of the deconvolution network to complete construction of a spatiotemporal convolution and deconvolution network;
   (3.4) performing the global averaging pooling on a last layer of feature maps of the up-sampling layers of a spatiotemporal deconvolution network to get the vectorized expression;
   (3.5) adding object saliency supervision to any selected layer of feature maps in the spatiotemporal convolution and deconvolution network;
   (3.6) adding motion saliency supervision to any selected layer of the feature maps in the spatiotemporal convolution and deconvolution network to complete construction of the spatiotemporal convolution-deconvolution network;
   (3.7) connecting a fully-connected layer after the convolution layer is vectorially expressed and a deconvolution layer is vectorially expressed, wherein the fully-connected layer is configured to predict the action category.

5. The spatiotemporal action detection method according to claim 4, wherein the step (4) specifically comprises:
   (4.1) dividing the sample video into T time segments after spatiotemporal convolution and stitching features $x_i$ (i=1, ..., T) of the fully-connected layer connected to the spatiotemporal convolution network;
   (4.2) calculating a T-dimensional weight vector $w=[w_1, w_2, ..., w_T]$ through the global averaging pooling; and
   (4.3) adding the sparse constraint obtained according to the weight vector to the spatiotemporal convolution-deconvolution network to complete construction of the network structure S.

6. The spatiotemporal action detection method according to claim 5, wherein the step (6) specifically comprises:
   (6.1) performing the non-maximum suppression on detection frames sampled and obtained on a heat map to obtain object candidate frames;

(6.2) filtering a time interval of an action through calculating the weight vector corresponding to each time segment of the sample video; and (6.3) combining a space location corresponding to the object candidate frames with the time interval to obtain the object action spatiotemporal location.

7. The spatiotemporal action detection method according to claim 6, wherein the step (6.1) specifically comprises:

(6.1.1) calculating a distribution probability map of the action by using a grade-based class activation map (Grad-CAM);

(6.1.2) performing dense sampling on the heat map to obtain detection frames of various sizes;

(6.1.3) performing the non-maximum suppression on each detection frame with a threshold of 0.3 to obtain the object candidate frames;

(6.1.4) sorting the object candidate frames, wherein a formula for sorting is provided as follows:

$$s = \frac{sum(H(x, y, w, h))}{w \times h} + \varepsilon * (w \times h),$$

wherein sum(H(x, y, w, h)) represents an interval [x, y, w, h], a hyper parameter c is configured to be 0.00002, (x, y) represent initial coordinates corresponding to an object candidate frame on the heat map, w and h respectively represent a height and a width of the object candidate frame, and H represents all heat energy values in the object candidate frame; and (6.1.5) correcting an obtained object candidate frame, wherein a formula for correcting is provided as follows:

$$B_t = \begin{cases} B_h, & IoU(B_s, B_h) > 0.3 \\ S(B_s, B_{t-1}), & \text{otherwise} \end{cases},$$

wherein $B_t$ represents the object detection frame at time t, $B_s$ is the obtained object candidate frame, and a function S represents size adjustment of $B_s$ to be identical to a size of $B_{t-1}$ while keeping a center unchanged.

8. The spatiotemporal action detection method according to claim 4, wherein the step (3.4) specifically comprises:

(3.4.1) constructing an object saliency map AH according to the object detection frames contained in an object set; and (3.4.2) adding the object saliency supervision to an $m^{th}$ layer of the feature maps of the spatiotemporal convolution and deconvolution network to obtain model output:

$$f_o = (1 + A_H \cdot f_m)/(1 + \alpha),$$

wherein $f_m$ is the feature map of the $m^{th}$ layer, $f_o$ is the model output after the object saliency supervision is added, and the hyper parameter $\alpha$ is configured to adjust an object saliency degree.

9. The spatiotemporal action detection method according to claim 4, wherein the step (3.5) specifically comprises:

(3.5.1) extracting an optical flow map $A_M$ in an input sequence through an optical flow method in the input sequence; and (3.5.2) adding the motion saliency supervision to an $m^{th}$ layer of feature maps of the spatiotemporal convolution and deconvolution network to obtain model output:

$$f_o = (1 + A_M \cdot f_m)/(1 + \beta),$$

wherein $f_m$ is the feature map of the $m^{th}$ layer, $f_o$ is the model output after the motion saliency supervision is added, and a hyper parameter $\beta$ is configured to adjust an motion saliency degree.

10. The spatiotemporal action detection method according to claim 5, wherein after the sparse constraint is added in the step (4.3), an objective function of the spatiotemporal convolution and deconvolution network is:

$$l = l_{class} + \lambda l_{sparse}$$

wherein $l_{sparse} = \|w\|_1$ is sparsity loss configured to forcibly eliminate a part with a sparse coefficient of 0 and keep a part with a sparse coefficient whose value is not 0, $l_{class}$ is configured to classify cross entropy loss, and $\lambda$ is a weight coefficient.

11. The spatiotemporal action detection method according to claim 2, wherein the step (2) specifically comprises:

(2.1) performing normalization on values of optical flows in a horizontal direction and a vertical direction contained in the optical flow information;

(2.2) obtaining grayscale images of a single channel in the horizontal direction and the vertical direction of optical flow images by using the Pythagorean theorem; and (2.3) obtaining a motion information interval according to the grayscale images.

\* \* \* \* \*